United States Patent
Benning et al.

(10) Patent No.: US 7,357,572 B2
(45) Date of Patent: Apr. 15, 2008

(54) TOTAL AIR TEMPERATURE PROBE HAVING IMPROVED DEICING HEATER ERROR PERFORMANCE

(75) Inventors: Kevin J. Benning, Lakeville, MN (US); Fred A. Steffen, Shakopee, MN (US); Charles R. Willcox, Eden Prairie, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 140 days.

(21) Appl. No.: 11/230,907

(22) Filed: Sep. 20, 2005

(65) Prior Publication Data

US 2007/0064766 A1 Mar. 22, 2007

(51) Int. Cl.
*G01K 13/02* (2006.01)
(52) U.S. Cl. ...................................... 374/138
(58) Field of Classification Search ................. 374/138
See application file for complete search history.

(56) References Cited

U.S. PATENT DOCUMENTS

| | | | |
|---|---|---|---|
| 2,970,475 A | 2/1961 | Werner | 73/339 |
| 3,167,960 A | 2/1965 | Miesiak | 374/138 |
| 3,368,406 A | 2/1968 | Hinnebaugh | 374/138 |
| 3,512,414 A | 5/1970 | Rees | 374/138 |
| 4,036,054 A | 7/1977 | Goulet | 73/861.66 |
| 4,047,379 A | 9/1977 | Brookes et al. | 374/135 |
| 4,206,645 A | 6/1980 | Orcutt | 374/138 |
| 4,403,872 A | 9/1983 | DeLeo | 374/138 |
| 4,458,137 A | 7/1984 | Kirkpatrick | 219/201 |
| 4,821,566 A | 4/1989 | Johnston et al. | 374/138 |
| 5,043,558 A | 8/1991 | Byles | |
| 5,302,026 A | 4/1994 | Phillips | 374/135 |
| 5,466,067 A | 11/1995 | Hagen et al. | 374/138 |
| 5,628,565 A | 5/1997 | Hagen et al. | 374/143 |
| 5,731,507 A | 3/1998 | Hagen et al. | 73/861.68 |
| 6,070,475 A | 6/2000 | Muehlhauser et al. | 73/861.68 |
| 6,076,963 A | 6/2000 | Menzies et al. | 374/138 |
| 6,609,825 B2 | 8/2003 | Ice et al. | 374/138 |
| 6,622,556 B1 | 9/2003 | May | 374/135 |
| 6,651,515 B2 | 11/2003 | Bernard | 73/861.65 |
| D497,114 S | 10/2004 | Willcox | D10/96 |
| 6,840,672 B2 | 1/2005 | Ice et al. | 374/139 |

FOREIGN PATENT DOCUMENTS

| | | |
|---|---|---|
| DE | 1 925 902 | 4/2007 |
| EP | 1 457 765 | 9/2004 |
| FR | 2 808 874 | 5/2000 |
| WO | WO 94/02814 | 2/1994 |
| WO | WO 01/44821 | 6/2001 |

OTHER PUBLICATIONS

Search Report dated Feb. 23, 2007 for EPO Application No. 06251712.3.

*Primary Examiner*—Gail Verbitsky
*Assistant Examiner*—Megann E Vaughn
(74) *Attorney, Agent, or Firm*—John D. Veldhuis-Kroeze; Westman, Champlin & Kelly, P.A.

(57) ABSTRACT

A total air temperature probe for measuring total air temperature includes a head having an airflow inlet, a main airflow exit, and a flow separation bend positioned between the airflow inlet and the main airflow exit. A plurality of bleed holes are in the flow separation bend. A bleed port air exit is coupled to the plurality of bleed holes. The head geometry is configured to provide enhanced deicing heater error (DHE) performance.

14 Claims, 6 Drawing Sheets

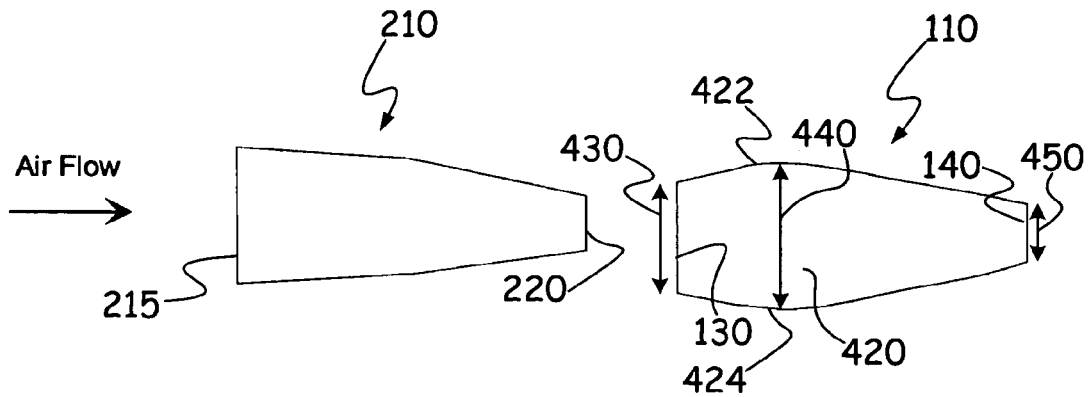
PRIOR ART
FIG. 4-1
FIG. 4-2
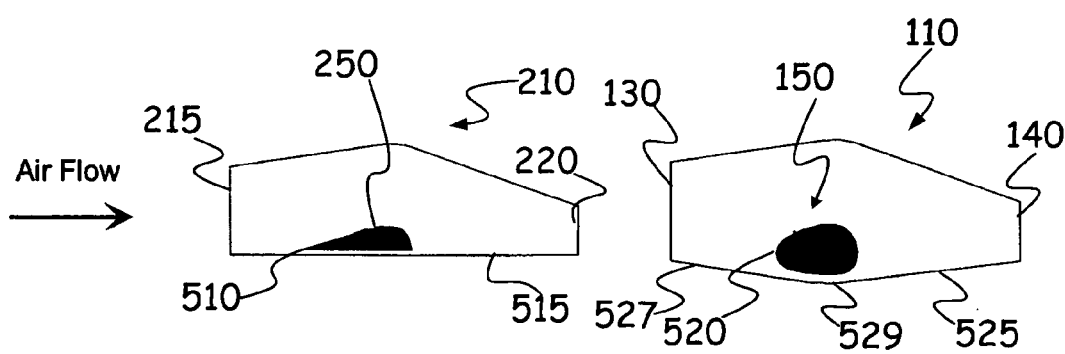
PRIOR ART
FIG. 5-1
FIG. 5-2

TOTAL AIR TEMPERATURE PROBE HAVING IMPROVED DEICING HEATER ERROR PERFORMANCE

BACKGROUND

The present invention relates to total air temperature (TAT) probes or sensors. More particularly, the present invention relates to improving deicing heater error (DHE) performance in TAT probes.

Modern jet powered aircraft require very accurate measurement of outside air temperature (OAT) for inputs to the air data computer, engine thrust management computer, and other airborne systems. For these aircraft types, their associated flight conditions, and the use of total air temperature probes in general, air temperature is better defined by the following four temperatures: (1) Static air temperature (SAT) or ($T_S$), (2) total air temperature (TAT) or ($T_t$), (3) recovery temperature ($T_r$), and (4) measured temperature ($T_m$). Static air temperature (SAT) or ($T_S$) is the temperature of the undisturbed air through which the aircraft is about to fly. Total air temperature (TAT) or ($T_t$) is the maximum air temperature that can be attained by 100% conversion of the kinetic energy of the flight. The measurement of TAT is derived from the recovery temperature ($T_r$), which is the adiabatic value of local air temperature on each portion of the aircraft surface due to incomplete recovery of the kinetic energy. Temperature ($T_r$) is in turn obtained from the measured temperature ($T_m$), which is the actual temperature as measured, and which differs from recovery temperature because of heat transfer effects due to imposed environments. For measuring the TAT, TAT probes are well known in the art.

Conventional TAT probes, although often remarkably efficient as a TAT sensor, sometimes face the difficulty of working in icing conditions. During flight in icing conditions, water droplets, and/or ice crystals, are ingested into the TAT probe where, under moderate to severe conditions, they can accrete around the opening of the internal sensing element. An ice ridge can grow and eventually break free—clogging the sensor temporarily and causing an error in the TAT reading. To address this problem, conventional TAT probes have incorporated an elbow, or bend, to inertially separate these particles from the airflow before they reach the sensing element.

Another phenomena which presents difficulties to some conventional TAT probe designs has to do with the problem of boundary layer separation, or "spillage", at low mass flows. Flow separation creates two problems for the accurate measurement of TAT. The first has to do with turbulence and the creation of irrecoverable losses that reduce the measured value of TAT. The second is tied to the necessity of having to heat the probe in order to prevent ice formation during icing conditions. Anti-icing performance is facilitated by heater elements embedded in the housing walls. Unfortunately, external heating also heats the internal boundary layers of air which, if not properly controlled, provide an extraneous heat source in the measurement of TAT. This type of error, commonly referred to as DHE (Deicing Heater Error), is difficult to correct for. Commonly, in TAT probes, the inertial flow separation bend described above has vent, or bleed, holes distributed along its inner surface. The holes are vented, through a bleed port air exit, to a pressure equal to roughly that of the static atmospheric pressure outside of the TAT probe. In this manner, a favorable pressure difference is created which removes a portion of the boundary layer through the bleed holes, and pins the remaining boundary layer against the elbow's inner wall.

In certain situations, the differential pressure across the bleed holes can drop to zero due to the higher flow velocity along the elbow's inner radius. This stagnation of flow through the bleed holes creates a loss in boundary layer control. The resulting perturbation, if large enough, can cause the boundary layer to separate from the inner surface and make contact with the sensing element. Because the housing walls are heated, so is the boundary layer. Hence, any contamination of the main airflow by the heated boundary layer will result in a corresponding error in the TAT measurement. In general, it is difficult to prevent the stagnation of some of the bleed holes. Thus, DHE is difficult to prevent or reduce.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A total air temperature (TAT) probe for measuring total air temperature includes a head having an airflow inlet, a main airflow exit, and a flow separation bend positioned between the airflow inlet and the main airflow exit. A plurality of bleed holes are in the flow separation bend. A bleed port air exit is coupled to the plurality of bleed holes. The bleed port air exit has a perimeter shape with a curved front end. In some embodiments, other head features provide or contribute to improved deicing heater performance (DHE) of the TAT probe. For example, in some embodiments, the head has a maximum width at a position which is rearward (toward the main airflow exit) of the airflow inlet. Also, in some embodiments, the head has a non-planar bottom exterior edge or surface.

BRIEF DESCRIPTION OF THE DRAWINGS

FIG. 2-1 is a diagrammatic side view illustration of a prior art TAT probe embodiment.

FIG. 2-2 is a diagrammatic side view illustration of a TAT probe embodiment in accordance with FIGS. 1-1 and 1-2.

FIGS. 4-1 and 4-2 are diagrammatic end view illustrations comparing features of a prior art TAT probe head and a TAT probe head in accordance with some embodiments of the invention.

FIGS. 5-1 and 5-2 are diagrammatic side view illustrations comparing features of a prior art TAT probe head and a TAT probe head in accordance with some embodiments of the invention.

FIGS. 6-1 through 6-4 are diagrammatic illustrations of bleed port air exit perimeter shapes.

FIGS. 7-1 and 7-2 are plots illustrating TAT measurement error improvement.

DETAILED DESCRIPTION

Figure 1:
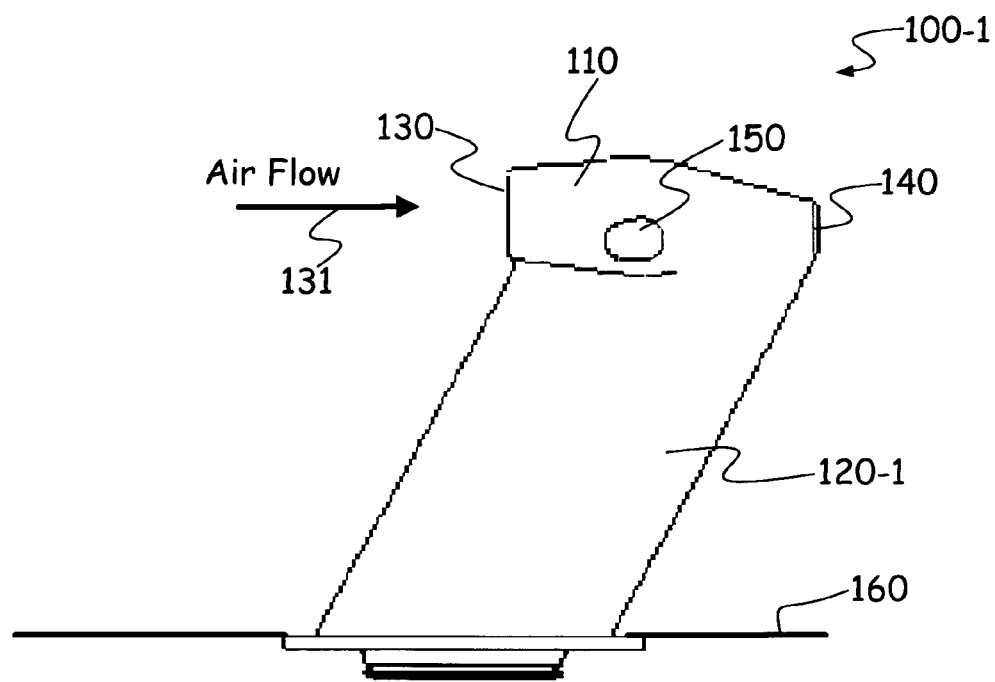
FIGS. 1-1 and 1-2 are diagrammatic side view illustrations of total air temperature (TAT) probes in accordance with some embodiments of the invention.

FIG. 1-1 is a diagrammatic side view illustration of a total air temperature (TAT) probe 100-1 embodiment in accordance with the present invention. TAT probe 100-1 includes a head 110 supported by a strut 120-1. Head 110 has an airflow inlet 130 and a main airflow exit or exit channel 140. Airflow enters airflow inlet 130, which is also referred to as an inlet scoop, moving in a direction relative to probe 100-1, the direction for example as represented by arrow 131. Typically, TAT probe 100-1, which in operation is mounted to an aircraft surface 160, is moving in a direction which has a component opposite to the direction of arrow 131. A portion of the airflow entering airflow inlet 130 will exit through main airflow exit 140. Another portion of the airflow entering inlet 130 will be diverted into a sensor flow passage 280 (shown in FIG. 2-2).

Figures 1, 2:
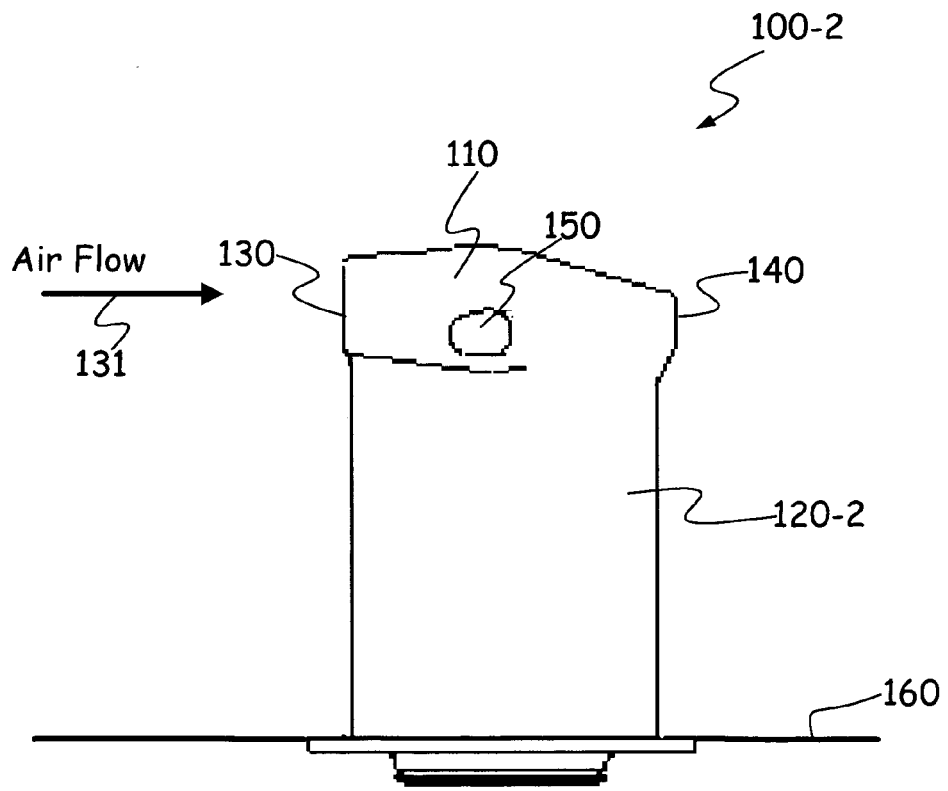
Figures 1, 2:
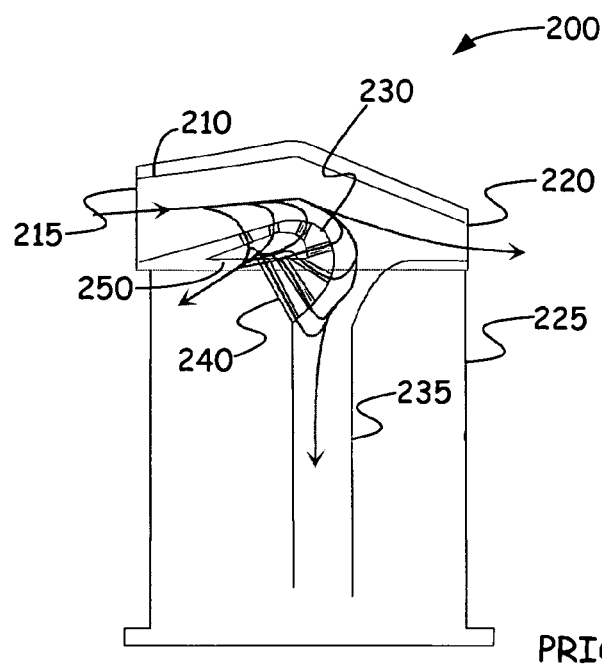
Figure 2:
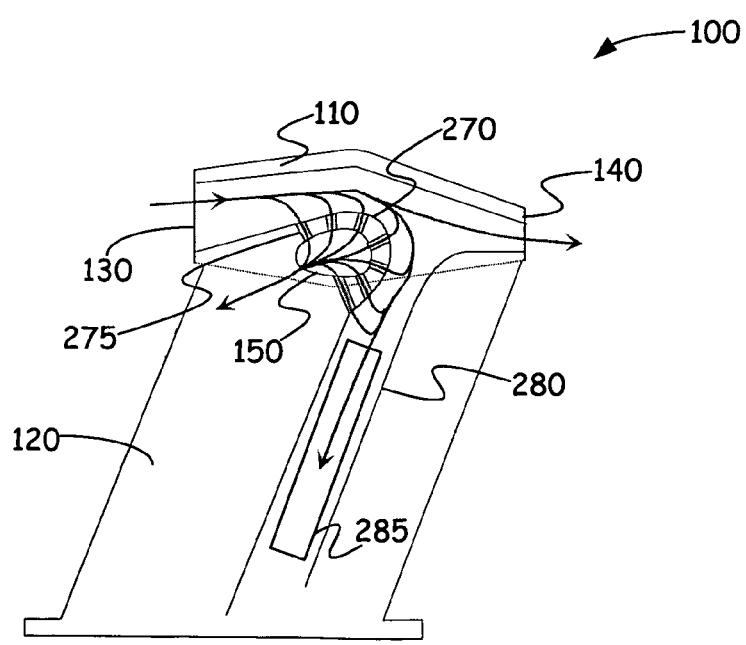

As shown in FIG. 2-2, a flow separation bend or elbow 270 in head 110 is positioned between airflow inlet 130 and main airflow exit 140 in order to divert the portion of the airflow into sensor flow passage 280. A TAT sensor 285 is positioned in sensor flow passage 280 for purposes of measuring the TAT in a manner as is generally known in the art. As can be seen in FIG. 2-2, sensor flow passage 280 is formed in strut 120 (for example strut 120-1 shown in FIG. 1-1 or 120-2 shown in FIG. 1-2).

As can also be seen in FIG. 2-2, flow separation bend 270 includes multiple bleed holes 275 extending from the various airflow channels or passages into a bleed exit port 150. Bleed exit port 150 formed in head 110 extends laterally between sidewalls of the head in a direction which is substantially or approximately perpendicular to a direction of airflow 131 entering inlet 130, or to a direction of airflow between inlet 130 and main airflow exit 140. As will be described below in greater detail, head 110 includes features which have been found to improve deicing heater error (DHE) performance. Some of the features of the disclosed embodiments relate to shapes and dimension relationships of head 110, while others relate to shapes of bleed port air exit 150.

Referring back to FIG. 1-2, shown is a diagrammatic side view illustration of a second TAT probe 100-2 embodiment in accordance with the present invention. Probe 100-2 differs from probe 100-1 primarily with reference to the shape of strut 120-2 relative to strut 120-1. Probe 100-2 shown in FIG. 1-2 is included for purposes of emphasizing that the particular shape or size of strut 120-2 does not limit the scope of the present invention. In the remainder of the application, instead of referring to TAT probe embodiments 100-1 or 100-2, a more general reference to TAT probe embodiments 100 is made. Reference to TAT probe 100 is intended to encompass both of embodiments 100-1 and 100-2, as well as other embodiments. Likewise, instead of referring to struts 120-1 and 120-2, in remaining discussions of TAT probe embodiments, a generic reference to strut 120 is made. This generic reference to strut 120 encompasses strut embodiment 120-1, strut embodiment 120-2, as well as other strut embodiments.

For reference purposes, FIG. 2-1 provides a diagrammatic cross sectional illustration of a conventional TAT probe 200. Similar to TAT probe 100, TAT probe 200 includes a head 210 supported by a strut 225. The head includes an airflow inlet 215, a main airflow exit 220, and a flow separation bend 230 positioned between the airflow inlet and the main airflow exit. TAT probe 200 also includes a sensor flow passage 235 formed in strut 225, bleed holes 240 and a bleed exit port 250. As was the case with TAT probe 100, flow separation bend 230 diverts a portion of the airflow into sensor flow passage 235. Bleed holes 240 vent a portion of the heated boundary layer to laterally extending bleed port exit 250 in order to reduce DHE. Probe 200 differs from probe 100 in several aspects. For example, head 210 of probe 200 has a different shape than head 110 of probe 100. Also, the perimeter shape of bleed port air exit 250 of probe 200 differs from that of the perimeter shape of bleed port air exit 150 of probe 100. These feature differences, alone or in combination, have been found to provide improved DHE performance.

Figure 3:
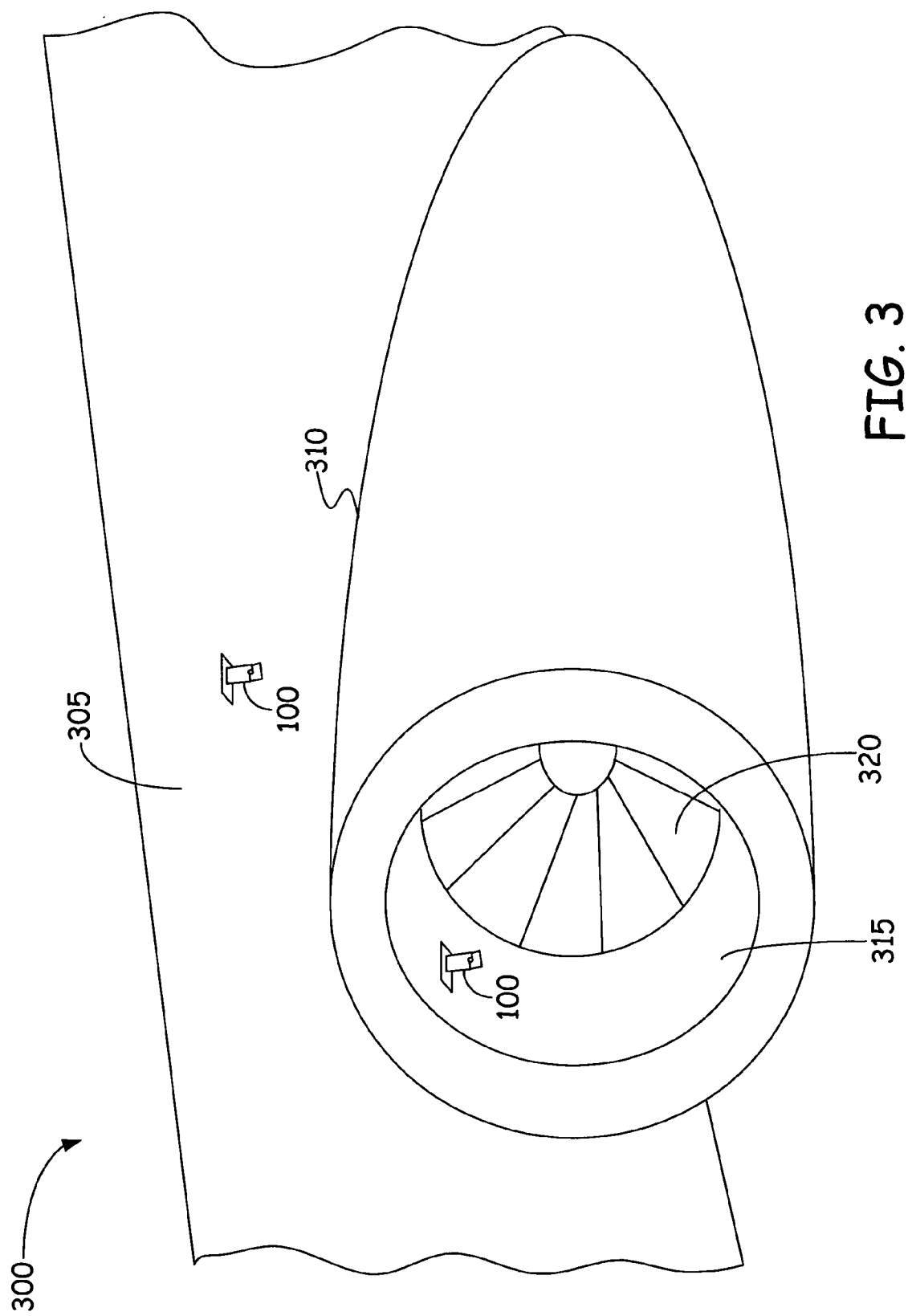
FIG. 3 is a diagrammatic perspective view of TAT probes of the present invention mounted to aircraft surfaces.

FIG. 3 is a diagrammatic perspective view of a portion of an aircraft 300 on which TAT probe 100 can be mounted. FIG. 3 illustrates various surfaces on which TAT probe 100 can be mounted, and therefore various surfaces which correspond to surface 160 shown in FIGS. 1-1 and 1-2. The specific locations at which TAT probe 100 is shown mounted in FIG. 3 are provided for illustrative purposes only, and are not intended to designate exact mounting locations in any particular use of TAT probe 100. As shown in FIG. 3, aircraft 300 includes a fuselage 305 and an aircraft engine 310. While TAT probe 100 can be positioned or mounted on other surfaces of aircraft 300, in this particular embodiment, TAT probes are shown mounted to the skin of fuselage 305 and to surface 315 of engine 310. For the engine mounted TAT probe, surface 315 forms part of the inlet portion of engine 310, upstream of fan blades 320. Other aircraft engine surfaces can also be used. To reiterate, the present invention is not limited to TAT probes mounted to surfaces of aircraft engines or to any particular fuselage location, but instead applies more generally to TAT probes mounted to any aircraft surfaces for purposes of measuring TAT.

Figures 1, 6:
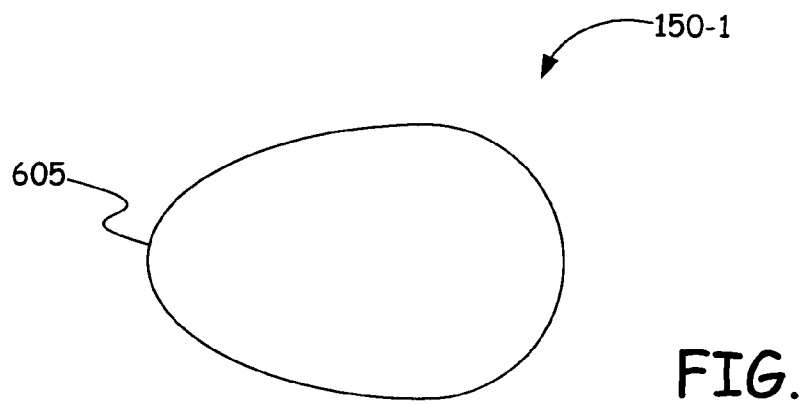
Figures 2, 6:
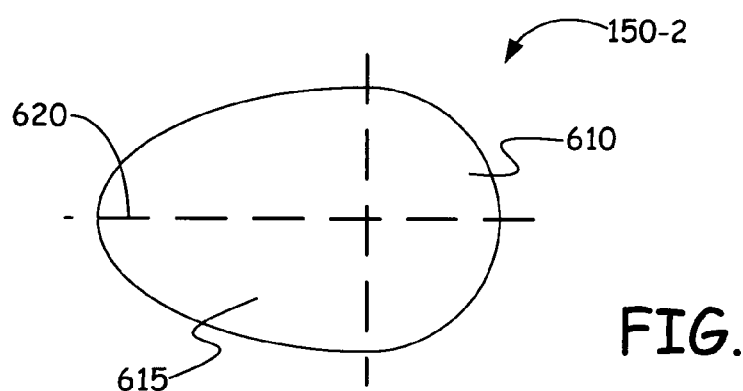
Figures 3, 6:
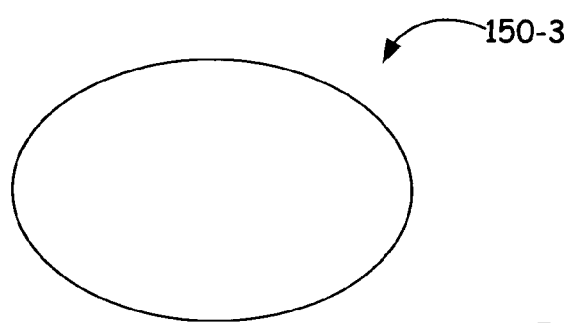
Figures 4, 6:
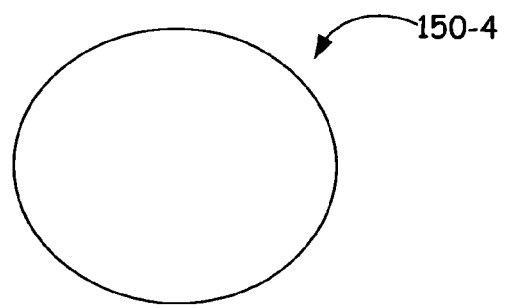

Referring now to FIGS. 4-1 and 4-2, shown are a conventional TAT probe head 210 and a TAT probe head 110 in accordance with the present invention, respectively. FIGS. 4-1 and 4-2 are diagrammatic top or end views of heads 210 and 110. From these views, the respective struts of the TAT probes would be beneath the heads. As can be seen in FIG. 4-1, in convention TAT probe 210, the inlet 215 is the widest portion of the head. After the inlet 215, the width of head 210 tapers back to main airflow exit 220.

In contrast, as shown in FIG. 4-2, head 110 of TAT probe 100 is not widest at inlet 130, but is instead widest at a position rearward (relative to inlet 130 in the direction of airflow) of the inlet. In a particular embodiment illustrated in FIG. 4-2, inlet 130 has a width represented by arrow 430, while main airflow exit 140 has a width represented by arrow 450. Opposing sidewalls 422 and 424 extend from the respective sides of the head between airflow inlet 130 and main airflow exit 140. Although not shown in FIG. 4-2, bleed port air exit 150 extends through head 110 between sidewalls 422 and 424. In a middle portion 420 of head 110, which is rearward of airflow inlet 130 (toward main airflow exit 140), the head has a width represented by arrow 440. This width 440 represents a maximum width of head 110 between sidewalls 422 and 424. The maximum width 440 is greater than the width 440 at inlet 130.

Referring now to FIGS. 5-1 and 5-2, respectively shown are diagrammatic side view illustrations of other features of head 110 in embodiments of TAT probe 100 relative to conventionally shaped TAT probe heads 210. As shown in FIG. 5-1, conventionally, head 210 of a TAT probe has a laterally extending bleed port air exit 250 which has a teardrop perimeter shape. The teardrop perimeter shape has a pointed edge 510 at the end closest to the airflow inlet 215. Head 210 also has a substantially flat or planar bottom exterior edge or surface 515 extending between airflow inlet 215 and main airflow exit 220.

In contrast, head 110 of TAT probe 100 has both an improved bleed port air exit perimeter shape, and an improved bottom exterior edge or surface shape. As will be described below in greater detail with reference to FIGS. 6-1 through 6-4, bleed port air exit 150 of head 110 has a perimeter shape with a curved front end 520. Curved front end 520 is the end closest to airflow inlet 130. Contrast curved front end portion 520 of bleed port air exit 150 with the sharp corner 510 of bleed port air exit 250 of conventional TAT probe head 210.

Also, in head 110 of TAT probe 100, bottom exterior edge or surface 529 of the head is not substantially flat or planar. Instead, bottom exterior edge or surface 529 bows downward between airflow inlet 130 and main airflow exit 140. In one example embodiment, bottom exterior edge or surface 529 is lowest in an area adjacent to bleed port air exit 150, and includes several non-parallel exterior edge or surface segments. For example, exterior edge or surface segment 527 extends from airflow inlet 130 downward toward a middle portion of bottom exterior edge or surface 529, while exterior edge or surface segment 525 extends upwards from the middle portion toward main airflow exit 140.

Referring now to FIGS. 6-1 through 6-4, shown are diagrammatic illustrations of perimeters shapes of various bleed port air exit 150 embodiments in accordance with the present invention. As shown in FIG. 6-1, in a general embodiment 150-1 of the bleed port air exit perimeter shape, a front end 605 (corresponding to front end 520 shown in 5-2) is curved. While front end or portion 605 is curved in various embodiments, other portions of bleed port air exit 150-1 can also be curved, though this need not be the case in all embodiments. In bleed port air exit embodiment 150-1, the perimeter shape is continuously curved in a substantially egg or oval shape. An egg shape, also referred to as an oval or ovoid shape, is any curve resembling a cross-section of an egg. These shapes can include egg shapes such as shown in bleed port air exit embodiments 150-1 and 150-2 shown in FIGS. 6-1 and 6-2 in which the perimeter shape is a combination of substantially half of an elliptical shape (represented by portion 615) and half of a circular shape (represented by portion 610). In other embodiments, other oval or ovoid (i.e., egg) shapes can be used as well. For example, FIG. 6-3 illustrates an embodiment 150-3 of a bleed port air exit perimeter shape which is an elliptical curve. Similarly, FIG. 6-4 illustrates an embodiment 150-4 of a bleed port air exit perimeter shape which is circular.

In embodiments in which the perimeter shape of the bleed port air exit is an oval or ovoid shape, a number of characteristic features can be used to describe most embodiments. For example, some such embodiments are differentiable (smooth-looking), simple (not self-intersecting), closed, plane, curves. Also, in such embodiments, the shape can have at least one axis of symmetry. For example, as shown in FIG. 6-2, the oval or egg shape embodiment 150-2 has an axis of symmetry 620. It is important to note that other examples of oval shapes can also be used. Further, it is not necessary in all embodiments that the perimeter shape be completely oval or egg shaped. For example, it is not necessary in all embodiments that the perimeter shape be continuously curved around its entire perimeter. Likewise, it is not necessary that the perimeter shape have an axis of symmetry. Instead, other shapes having a curved front end 605 can also be used. Substantially oval or egg shaped perimeters can be used. These embodiments can be curved around the perimeter, but may be slightly asymmetric. These oval or egg looking shapes are considered to be substantially oval or egg shaped. Examples include elliptical type shapes with curved ends and substantially straight sides, but which are slightly asymmetric.

Figures 1, 7:
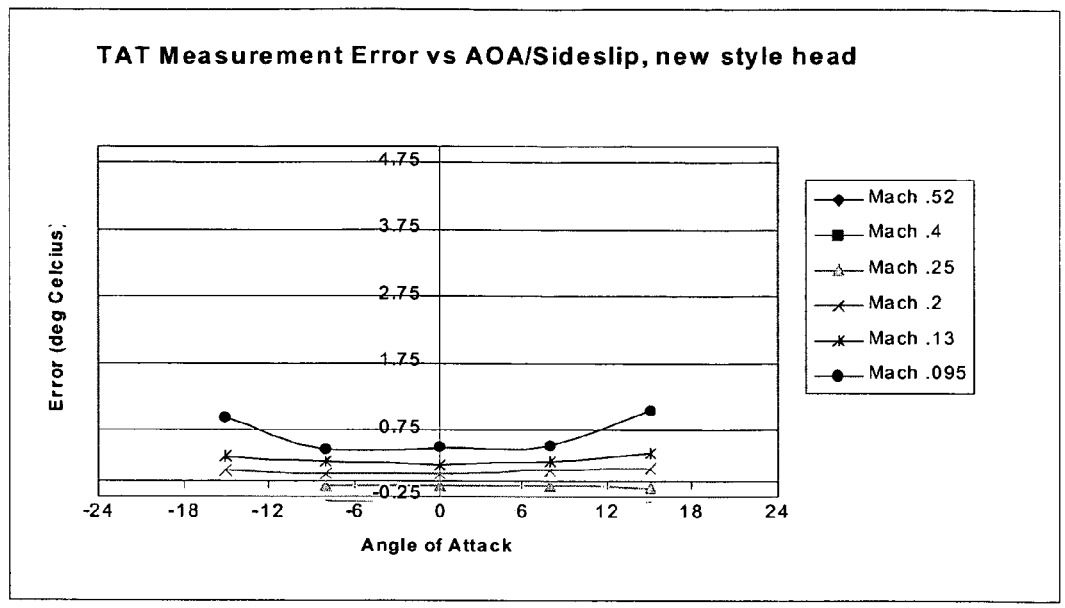
Figures 2, 7:
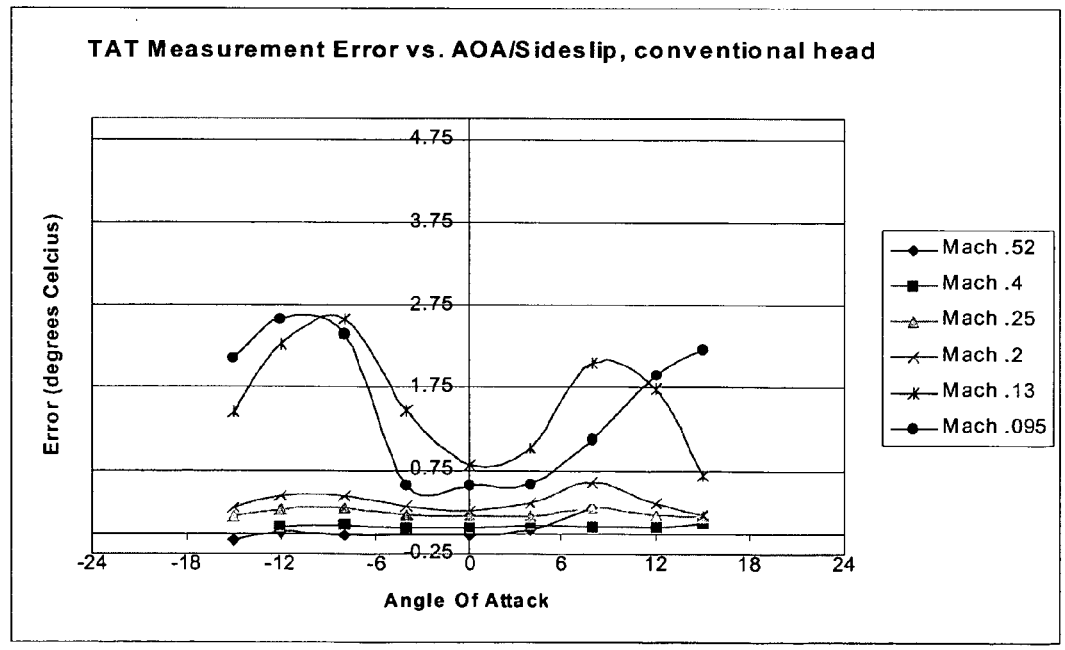

Referring now to FIGS. 7-1 and 7-2, shown are plots of TAT measurement error as a function of angle of attack (AOA)/sideslip for both TAT probe 100 having head 110 (FIG. 7-1) and for a conventional TAT probe having a conventional head (FIG. 7-2). As can be seen by comparing the plots of FIGS. 7-1 and 7-2, the DHE has been found to be significantly less when using a TAT probe having head 110 with features as described above in accordance with embodiments of the present invention. Reducing DHE improves TAT probe performance in icing conditions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A total air temperature probe for measuring total air temperature, the probe comprising:
    a head having an airflow inlet, a main airflow exit, and a flow separation bend positioned between the airflow inlet and the main airflow exit, the flow separation bend having a plurality of bleed holes; and
    a bleed port air exit coupled to the plurality of bleed holes, the bleed port air exit having a perimeter shape with a curved front end, the curved front end being a closest portion of the perimeter shape relative to the airflow inlet.

2. The total air temperature probe of claim 1, wherein the bleed port air exit is formed in the head and extends laterally between first and second sidewalls of the head in a first direction which is substantially perpendicular to a direction between the airflow inlet and the main airflow exit.

3. The total air temperature probe of claim 2, and further comprising:
    a strut coupled to and supporting the head;
    a sensor flow passage formed in the strut; and
    a total air temperature sensor positioned in the sensor flow passage.

4. The total air temperature probe of claim 2, wherein the head has a first width in a direction parallel to the first direction at the airflow inlet, and a maximum width in a direction parallel to the first direction rearward of the airflow inlet toward the main airflow exit, the maximum width being greater than the first width.

5. The total air temperature probe of claim 2, wherein the head has a non-planar bottom exterior surface extending between the airflow inlet and the main airflow exit.

6. The total air temperature probe of claim 1, wherein the perimeter of the bleed port air exit has a substantially oval shape.

7. The total air temperature probe of claim 6, wherein the substantially oval shape is a substantially egg shape.

8. The total air temperature probe of claim 6, wherein the substantially oval shape is a substantially elliptical shape.

9. The total air temperature probe of claim 6, wherein the substantially oval shape is a substantially circular shape.

10. A total air temperature probe for measuring total air temperature, the probe comprising:
    a head having an airflow inlet, a main airflow exit, and a flow separation bend positioned between the airflow inlet and the main airflow exit, the flow separation bend having a plurality of bleed holes, and further comprising a bleed port air exit formed in the head and coupled to the plurality of bleed holes, the bleed port air exit extending laterally between first and second sidewalls of the head in a first direction, wherein the bleed port air exit has a perimeter shape with a curved front end, the curved front end being a closest portion of the perimeter shape relative to the airflow inlet, and wherein the head has a first width in a direction parallel to the first direction at the airflow inlet, and a maximum width in a direction parallel to the first direction rearward of the airflow inlet toward the main airflow exit, the maximum width being greater than the first width;

a strut coupled to and supporting the head;

a sensor flow passage formed in the strut; and a total air temperature sensor positioned in the sensor flow passage.

11. The total air temperature probe of claim 10, wherein the perimeter of the bleed port air exit has a substantially oval shape.

12. The total air temperature probe of claim 11, wherein the substantially oval shape is a substantially egg shape.

13. The total air temperature probe of claim 11, wherein the substantially oval shape is a substantially elliptical shape.

14. The total air temperature probe of claim 11, wherein the substantially oval shape is a substantially circular shape.

* * * * *